United States Patent [19]
Nakano

[11] Patent Number: 5,903,596
[45] Date of Patent: May 11, 1999

[54] SPREAD SPECTRUM DEMODULATION UNIT

[76] Inventor: Takayuki Nakano, 167 Wedgewood Cir., Eatontown, N.J. 07724

[21] Appl. No.: 08/648,811

[22] Filed: May 16, 1996

[51] Int. Cl.⁶ ..................................................... H04K 1/00
[52] U.S. Cl. ........................................... 375/208; 375/347
[58] Field of Search ..................................... 375/206, 208, 375/343, 355, 347, 267, 200, 316

[56] References Cited

U.S. PATENT DOCUMENTS

| | | | |
|---|---|---|---|
| 4,599,732 | 7/1986 | LeFever | 375/231 |
| 4,901,307 | 2/1990 | Gilhousen et al. | 370/320 |
| 4,942,590 | 7/1990 | Terada | 375/208 |
| 5,084,913 | 1/1992 | Kingston et al. | 375/208 |
| 5,109,390 | 4/1992 | Gilhousen et al. | 375/200 |
| 5,265,119 | 11/1993 | Gilhousen et al. | 375/200 |
| 5,361,276 | 11/1994 | Subramanian | 370/335 |
| 5,402,450 | 3/1995 | Lennen | 375/343 |
| 5,485,486 | 1/1996 | Gilhousen et al. | 375/206 |
| 5,583,884 | 12/1996 | Maruyama et al. | 375/207 |
| 5,691,974 | 11/1997 | Zehavi et al. | 375/208 |
| 5,699,380 | 12/1997 | Sugita | 375/208 |

Primary Examiner—Tesfaldet Bocure
Attorney, Agent, or Firm—Amster, Rothstein & Ebenstein

[57] ABSTRACT

An improved demodulation system assigns a reception timing for demodulation of a multi-path component of a transmission signal in accordance with an estimated rate of change of a correlation level of the multi-path component. An averaging circuit is provided for determining an average correlation level of a multi-path component in accordance with an averaging interval, wherein the averaging interval is determined in accordance with an estimated rate of change in the correlation level of a multi-path component. A moving speed display unit is provided for determining and displaying a relative moving speed between the transmitter and a receiver in accordance with an estimated rate of change of the correlation level of a multi-path component. A correlation level prediction circuit is provided for predicting the correlation level of a multi-path component in accordance with past measurements of the correlation level. A phase assignment circuit determines a reception timing assignment in accordance with the predicted correlation level for demodulating a multi-path component of a transmission signal by a demodulation circuit.

2 Claims, 16 Drawing Sheets

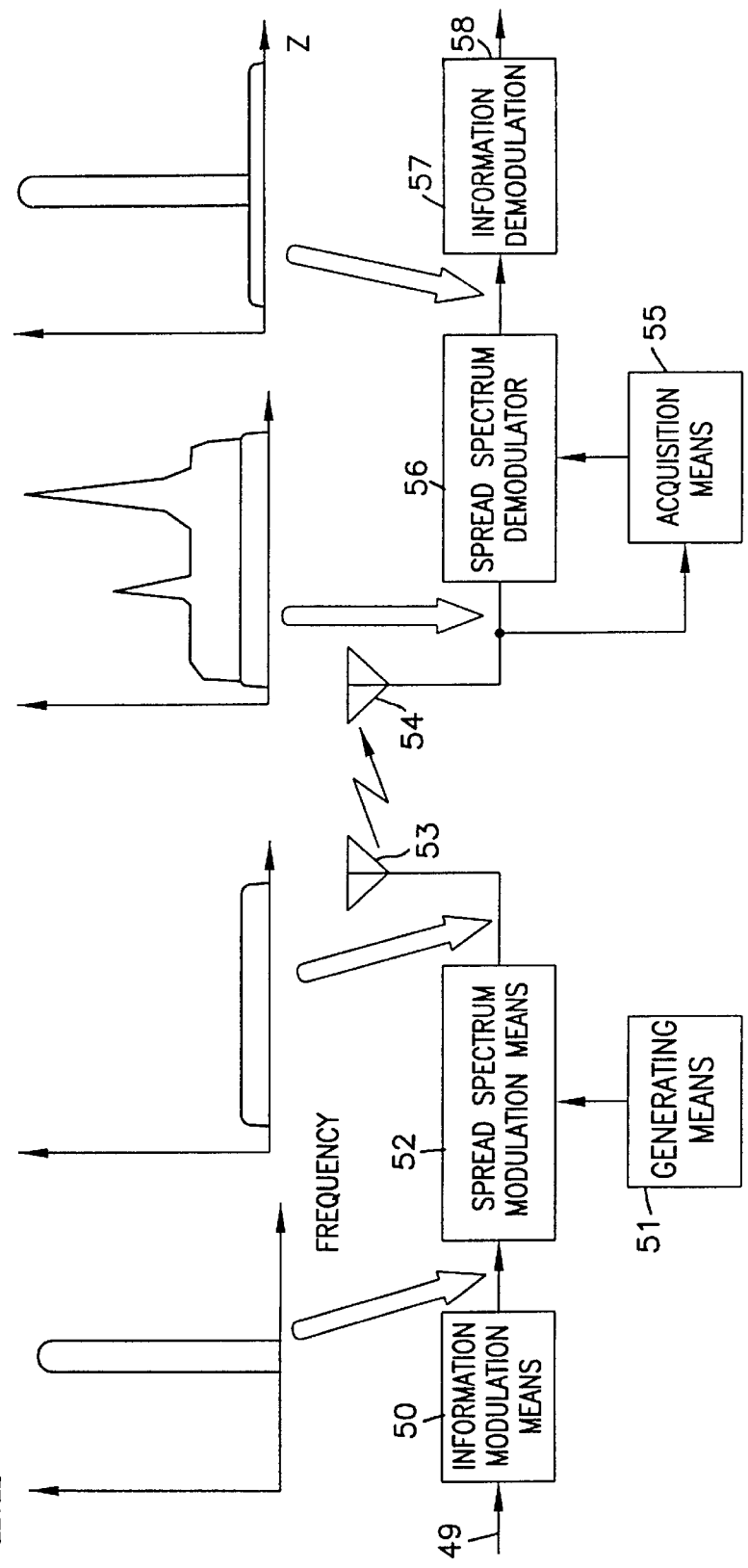

SPREAD SPECTRUM DEMODULATION UNIT

The present invention relates to a receiver unit and specifically to a spread spectrum communication receiver for providing improved reception by a mobile station during movement.

BACKGROUND OF THE INVENTION

In recent years, the demand for terrestrial mobile communications including cellular phones and portable phones has increased markedly. As a consequence, the need has increased for improved technology which more effectively utilizes the limited frequency bands to secure larger subscriber capacities. One type of system which has been offered for more effective frequency utilization is the code division multiple access system (CDMA). The CDMA system relies on spread spectrum transmission and provides improved reception over earlier transmission methods through the modulation of information signals by spread codes which have extremely low cross correlation while also having very sharp auto-correlation characteristics. An example of a terrestrial mobile communication system which utilizes the CDMA system for transmission is described in U.S. Pat. No. 4,901,307.

In the United States, existing CDMA transmission systems utilize a modulation method known as a direct spread system which permits a receiver known as a RAKE type receiver to separately demodulate and combine a plurality of detected multi-path components of a signal. An example of a prior art RAKE type receiver is described on pages 328 to 353 of IEEE. Proceeding Vol. 68, No. 3 (March 1980).

By way of background to the description of the invention to follow, a prior art spread spectrum communication system which uses the direct spread system will now be described. FIG. 1a shows the basic construction of a prior art spread spectrum transmitter. As shown in FIG. 1a, transmission data 49 is input to an information modulation means 50 which is used to modulate the transmission data. Spread code generating means 51 generates a spread code for use in spreading the modulated transmission data. Spread spectrum modulation means 52 uses the generated spread code to output a modulated spread spectrum signal. A transmission antenna 53 connected thereto is then used to transmit the modulated signal.

FIG. 1b shows the basic construction of a spread spectrum receiver including a reception antenna 54, a spread spectrum demodulation means 56 connected thereto, a spread code acquisition means 55, and an information demodulation means 57. The spread code acquisition means 55 is used to generate the spread code at the same phase as the spread code that was used in the transmitter to modulate the detected signal. The spread spectrum demodulation means 56 is used to demodulate the detected signal in a process which is complementary to that used by the spread spectrum modulation means 52 in the transmitter (FIG. 1a). The information demodulation means 57 is used to further demodulate the output of spread spectrum demodulation means 56 to yield reception data 58.

Information modulation means 50 of transmitter (FIG. 1a) produces a narrowband information signal having sufficient bandwidth only to carry the transmission data 49. After modulation with the spread code, however, the resulting signal is enlarged many times in bandwidth compared to the original narrowband information signal. In the receiver (FIG. 1b) the spread spectrum demodulation means 56 converts the wideband signal back into a narrowband information signal by multiplying it with the same spread code generated at the same phase by spread code acquisition means 55 and then integrating the result.

The transmissions detected at receiver antenna 54 (FIG. 1b) contain interfering frequency components due to spurious frequency signals and ambient thermal noise (shown as spikes and raised flat spectrum interference components in FIG. 1b). Reception of the spread spectrum signal reduces these interference components by despreading the detected signals with a spread code having very small crosscorrelation with respect to the interfering signals.

In a mobile communication environment, transmission on a channel frequently occurs along several different transmission paths, due to reflection, refraction, diffraction, and scattering of the transmitted signal, as illustrated in FIG. 2a. Such effects are commonly referred to as multi-path transmission. For example, in FIG. 2a, a base station 59 and a mobile station 60 are situated in proximity to a reflecting object 61 such as a building. Path 62 shows a direct path for a transmission arriving directly from base station 59. Path 63 shows an indirect path for the same transmission which arrives delayed after being reflected by building 61. FIG. 2b shows the respective correlation levels for each multi-path component which are detected at different reception timings with respect to the direct transmission path 62 and the delayed transmission path 63, respectively.

In order to correctly demodulate a spread spectrum signal having different reception timings according to different multi-path components, a spread spectrum demodulation means 56 of a receiver must be assigned to demodulate the multi-path component at the correct reception timing.

Signals which are subject to multi-path transmission due to reflections caused by buildings and other objects are subject to location dependent destructive interference between the different multi-path components. RAKE type receivers, which have a plurality of spread spectrum demodulation means 56 can be used to compensate for such multi-path transmission by having separate demodulation means 56 for demodulating different multi-path components.

The operations of a conventional RAKE type spread spectrum receiver will now be described. A block and schematic diagram of a conventional RAKE type demodulator is shown in FIG. 3. As illustrated in FIG. 3, a received input signal 1 from an antenna is applied to the several spread spectrum demodulation means 2, 3, 4, and 5. Spread spectrum demodulation means 2 through 5 are each assigned a different reception timing to separately demodulate the multi-path components of a transmission signal which has been received along different transmission paths. The outputs 6 through 9 of spread spectrum demodulation means 2 through 5 are applied to a received signal combining means 10 which combines them as a weighted sum to yield a maximal-ratio combined signal.

The spread spectrum demodulator incorporates a correlation level search means 12 for determining a correlation level 13 for each reception timing of a signal according to its different multi-path components. The correlation level 13 for each reception timing is input to a phase assignment means 14 which sets the reception timings of the spread spectrum demodulation means 2 through 5 for use in demodulating the detected multiple multi-path components.

FIG. 4 illustrates an example of the correlation levels for multi-path components of a transmission signal. Specifically, FIG. 4 illustrates the correlation levels 16 through 20 of multi-path components which are detected at the respective reception timings to through t4. As indicated by FIG. 4, the correlation levels 16 through 20 are at a maximum for the reception timings t0 to t4 for each of the respective multi-path components.

Assignment of the reception timings for demodulation by the spread spectrum demodulation means 56 is performed so as to select the subset of reception timings at which the highest correlation levels are observed. Thus, in this example, the spread spectrum demodulation means will be assigned to demodulate at reception timings t0, t1, t2 and t4 at which correlation levels 16, 17, 18 and 20 are detected, respectively. Reception timing t3 at which the lowest correlation level 19 is observed, will not be selected for assignment to the spread spectrum demodulation means because such would result in decreased demodulation performance.

In a mobile communication environment, Rayleigh fading, and other phenomena cause large time-dependent variations in the correlation levels of the signals received along particular transmission paths. Rayleigh fading is a periodic phenomenon which varies with time at a particular location in proportional relation with the speed at which a mobile station moves. The correlation level for each multi-path component subject to such fading can vary independently by more than 20 dB. As a result, the correlation level search means 12 must continually track the correlation levels detected for each multi-path component of a signal.

Notwithstanding such fading, a system and method is need which will permit a phase assignment means of a spread spectrum RAKE type receiver to assign reception timings for demodulating different multi-path components signals by the spread spectrum demodulation means 2 through 5 which will always correspond to the group of detected multiple multi-path components having the highest correlation level.

However, the conventional RAKE type spread spectrum demodulator is not capable of always assigning reception timings for demodulation which correspond to the highest overall correlation level because the correlation level for each multi-path component is constantly changing as a consequence of the mobile station's movement. In addition, the phase assignment means 14 of the conventional RAKE type receiver is subject to control delays occasioned by the detecting operations performed by correlation level search means 12 and additional delays in the phase assignment means in changing the reception timing settings of the spread spectrum demodulation means 2 through 5. As a result, the prior art RAKE type receiver frequently does not operate at the maximum correlation level during movement of a mobile station and consequently does not provide optimum reception quality.

With reference to FIG. 5a, a phase assignment operation by the prior art RAKE type receiver will be described in which the time change in correlation level of a multi-path component is slow in comparison with the control response speed of the phase assignment means 14. With reference to FIG. 5b, a phase assignment operation by the prior art RAKE type receiver will be described in which the time change in the correlation level for a multi-path component is fast in comparison with the control response speed of the phase assignment means 14. For the sake of simplicity, the case will be considered in which the number of detected multi-path components is two and the receiver contains only one spread spectrum demodulation means.

FIG. 5a illustrates an example in which the time change in correlation level for a multi-path component of a communication is slower than the speed of control effected by the phase assignment means 14. Curve 30 shows a time change in the correlation level for a multi-path component A of a multi-path signal. Curve 31 shows a time change in correlation level of a multi-path component B of a multi-path signal. Time point 33 indicates the time at which the correlation levels for multi-path components A and B cross, such that path B has higher correlation level thereafter. Time point 34 indicates the time at which the spread spectrum demodulation means is switched from demodulating at the reception timing of multi-path component A to that of multi-path component B. Thus, the control delay for effecting a change in reception timing assignment is shown by interval 32. Interval 35 indicates when the phase of the spread spectrum demodulation means is set to that of multi-path component A, and interval 36 indicates when the phase of the spread spectrum demodulation means is set to that of multi-path component B. Thus, the phase assignment means 14 is capable of switching the reception timing assignment of the demodulation means to a reception timing for a different multi-path component at which the higher correlation level is detected, after a control delay 32.

FIG. 5b illustrates an example in which the time change in correlation level for a multi-path component is faster than the speed of control effected by phase assignment means 14. Curve 37 shows a time change in the correlation level for a multi-path component C of a multi-path signal. Curve 38 shows a time change in the correlation level for a multi-path component D of the multi-path signal. Intervals 39 indicate when the reception timing of the spread spectrum demodulation means is set to that of multi-path component C, and intervals 40 indicate when the reception timing of the spread spectrum demodulation means is set to that of multi-path component D. In this example, due to the slowness of the control response effected by the phase assignment means 14, in comparison with the time change in correlation levels, the prior art RAKE type receiver is incapable of performing a reception timing assignment which results in demodulation of the higher correlation level signal.

According to the existing system operation as shown in FIG. 5a, despite the time change in correlation levels for the multi-path components being slow compared to the control response speed of the phase assignment means 14, the reception quality deteriorates during the interval of the control delay 32 in which demodulation is performed at the reception timing for the lower signal correlation level. However, according to the existing system operation as shown in FIG. 5b, when the time change in correlation level of a multi-path component is faster than the control response speed of the phase assignment means 14, the reception timing assignment results in demodulation of a multi-path component which is lower in correlation level at a given point in time than the multi-path component C, which also has the higher average signal correlation level. In such case, as illustrated in FIG. 5b, it would be desirable to avoid frequently switching the reception timing assignment of the spread spectrum demodulation means and to assign a reception timing which reflects the higher average signal correlation level.

Although the above examples have illustrated, for simplicity, cases in which the number of multi-path components is two, and the receiver includes only one spread spectrum demodulation means, the skilled person in the art will understand its applicability to cases where a number of spread spectrum demodulation means, as in the prior art RAKE type receiver, are used to separately demodulate a number of multi-path components to be combined as a maximal-ratio demodulated signal.

The present invention seeks to solve problems occasioned by the conventional phase assignment techniques of the prior art receiving systems such as the RAKE type receiver. Specifically, the present invention seeks to provide a system and method by which phase assignment control is performed which would permit a RAKE type receiver to assign reception timings for demodulation which more closely correspond to the multi-path components which have the higher correlation level at a given point in time. Through employment of such phase assignment control, the reception quality for multi-path transmissions will be improved.

Accordingly, it is an object of the present invention to provide a system and method which permits a RAKE type receiver to assign reception timings for demodulation which correspond more closely to the multi-path components which have higher correlation levels at a given point in time.

Another object of the invention is to provide a system and method which permits a mobile communication user to be informed of an estimated moving speed of the mobile communication receiver in relation to a transmitter.

Another object of the present invention is to estimate the rate of change of a detected correlation level and to perform the assignment of a reception timing based on that estimated rate of change.

Still another object of the present invention is to provide a predicted value of a correlation level of a multi-path component signal, and to perform the assignment of a reception timing based on that predicted value.

A still further object of the present invention is to provide a averaging means having a selected averaging interval for determining an average correlation level of a multi-path component of a transmission signal in accordance with that averaging interval, and to perform the assignment of a reception timing based thereon.

SUMMARY OF THE INVENTION

In the first of several embodiments of the present invention, a variation speed estimation means is coupled to a correlation level search means of a demodulation system for estimating the rate of change of a correlation level of a multi-path component of a transmission signal. An averaging means coupled to the variation speed estimation means is provided for selecting, in accordance with the estimated rate of change, an averaging interval over which an average correlation level of a multi-path component is to be determined. The averaging interval is provided to the phase assignment means 14 which determines, in accordance with the averaging interval, an average correlation level for each of a plurality of multi-path components of a transmission signal. The phase assignment means also assigns a reception timing to the demodulation means which is based on the average correlation level.

The variation speed estimation means is preferably implemented by means for differentiating the correlation level signal of a multi-path component and means for counting the number of zero-crossings of the differentiated correlation level signal per unit time.

Preferably, the averaging interval is selected to be long when the estimated rate of change in the correlation level is fast. Preferably, the averaging interval is selected to be short when then estimated rate of change is slow. Means is preferably provided in the demodulation system to determine and display, in accordance with the estimated rate of change of the correlation level of a multi-path component of a transmission, a relative speed of movement between a mobile communication receiver and a transmitter of that transmission. Preferably, the demodulation system demodulates a spread spectrum transmitted signal.

In another embodiment of the present invention a correlation level prediction means provides a predicted future correlation level of a multi-path component of a transmission signal which is based on past measurements of the correlation level for that multi-path component. The phase assignment means 14 is provided with the predicted correlation level and performs the assignment of a reception timing based on that predicted correlation level.

BRIEF DESCRIPTION OF THE DRAWINGS

FIG. 1a illustrates the structure and operations of a prior art spread spectrum transmission system.

FIG. 1b illustrates the structure and operations of a prior art spread spectrum receiving system.

DETAILED DESCRIPTION OF THE PREFERRED EMBODIMENTS

Figure 2B:
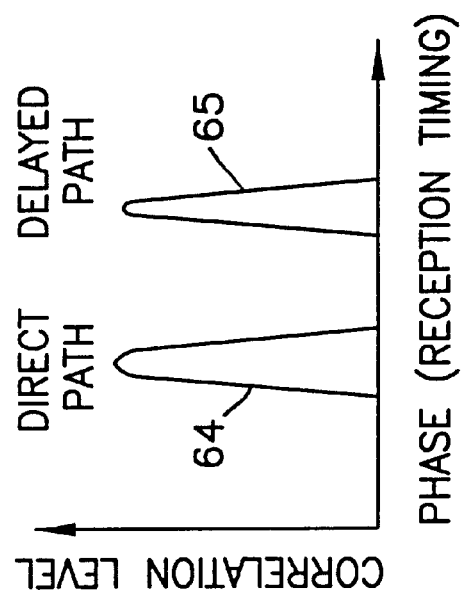
FIG. 2b is a graph showing the correlation levels versus reception timing for two multi-path components of a multiple path transmission signal.
Figure 2A:
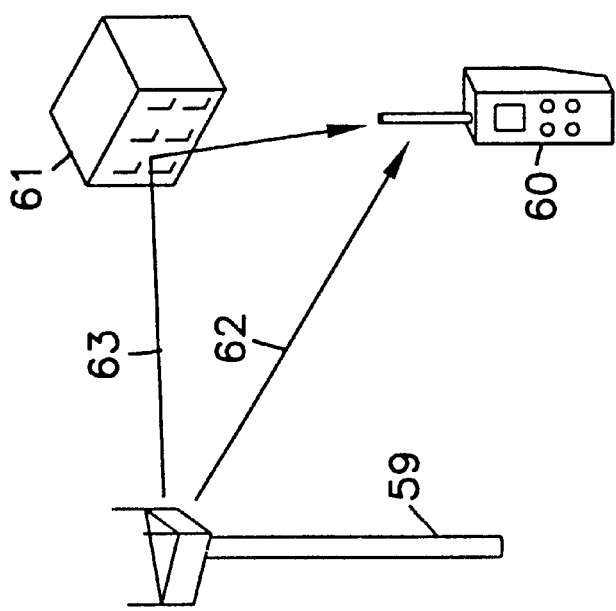
FIG. 2a illustrates multiple-path transmission in a mobile communication environment.
Figure 3:
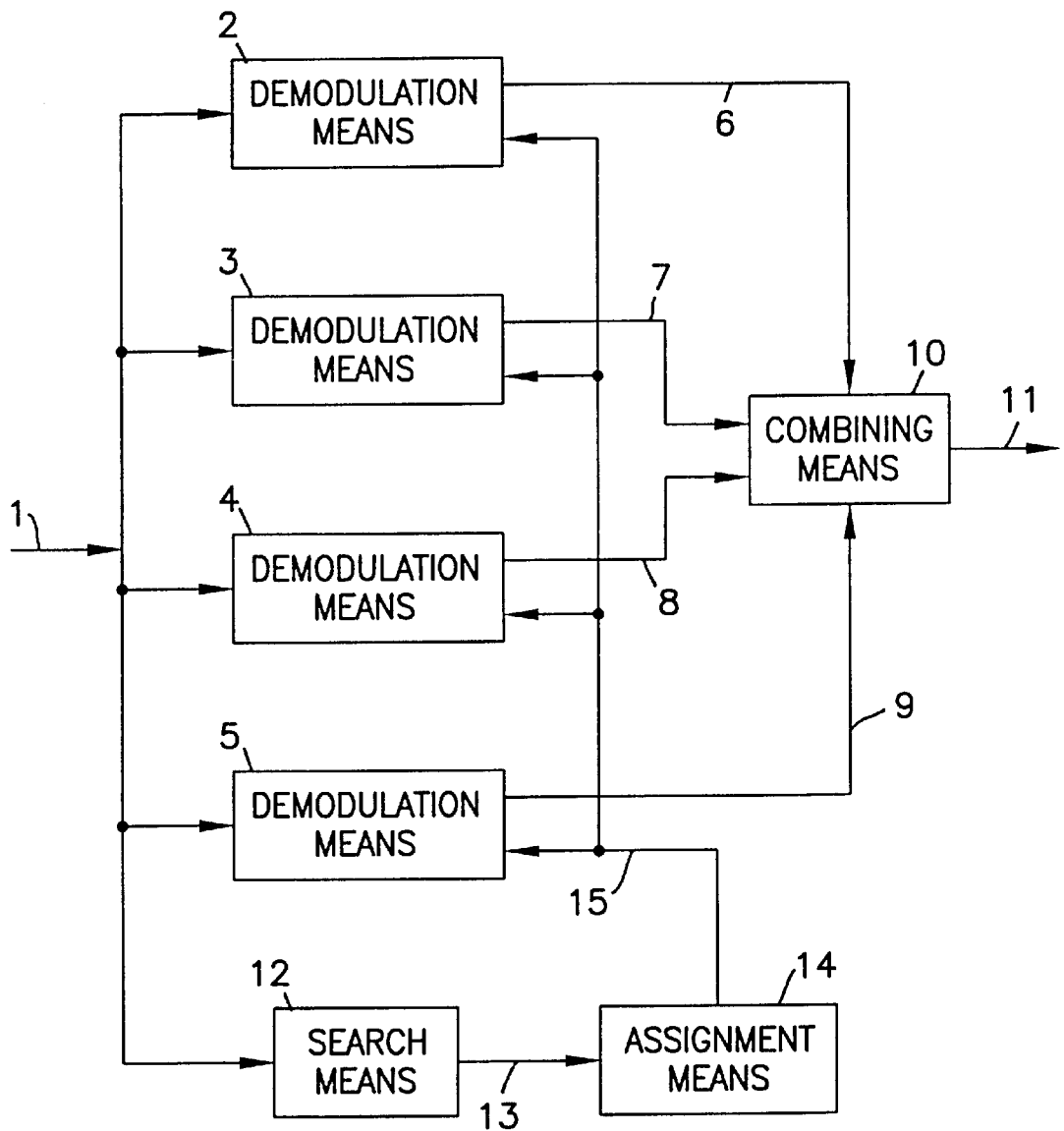
FIG. 3 shows a block and schematic diagram of a prior art spread spectrum RAKE type receiver.
Figure 4:
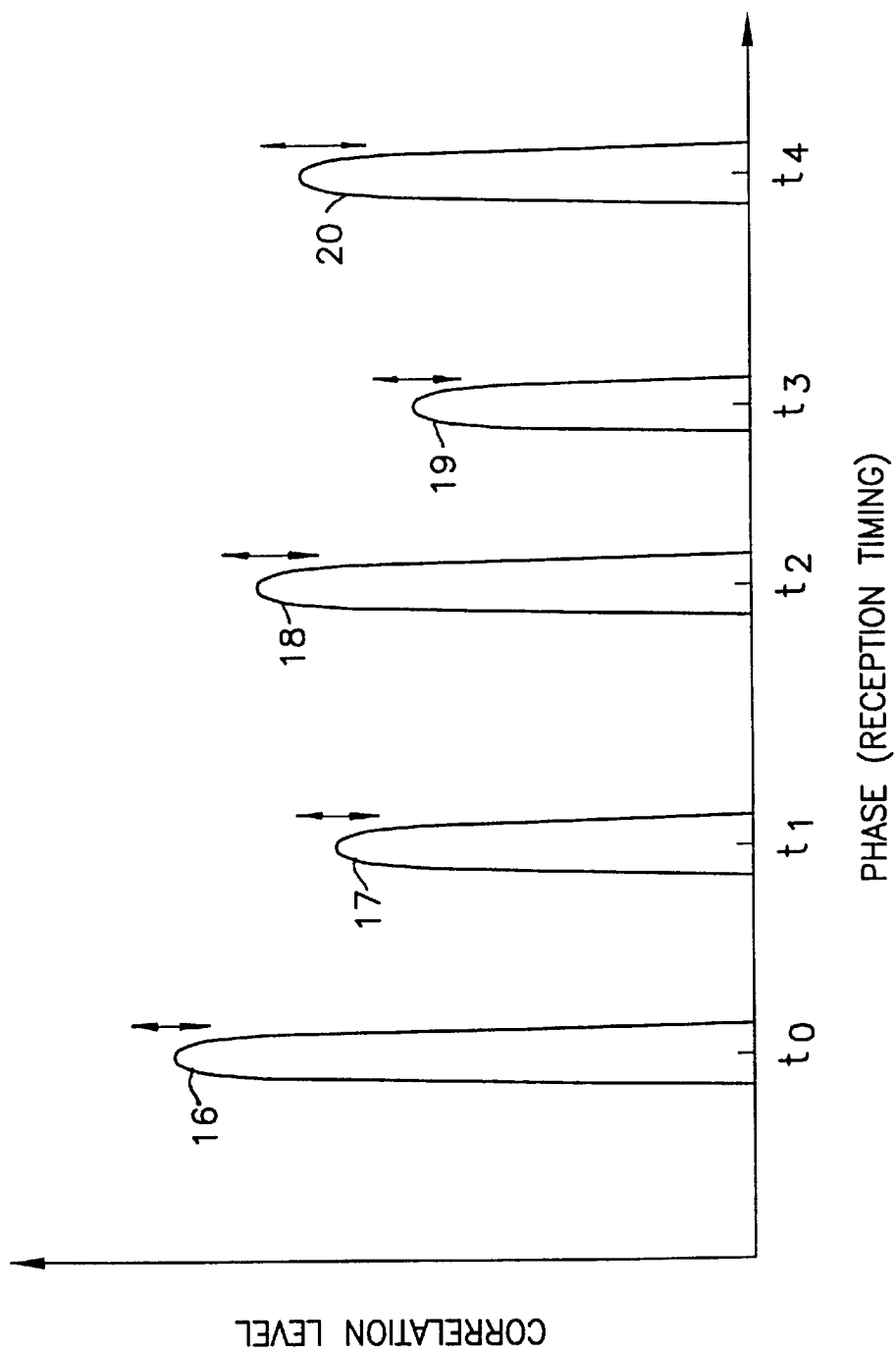
FIG. 4 is a graph showing the correlation levels of multi-path components of a transmission signal versus reception timing after spread spectrum demodulation.
Figure 6:
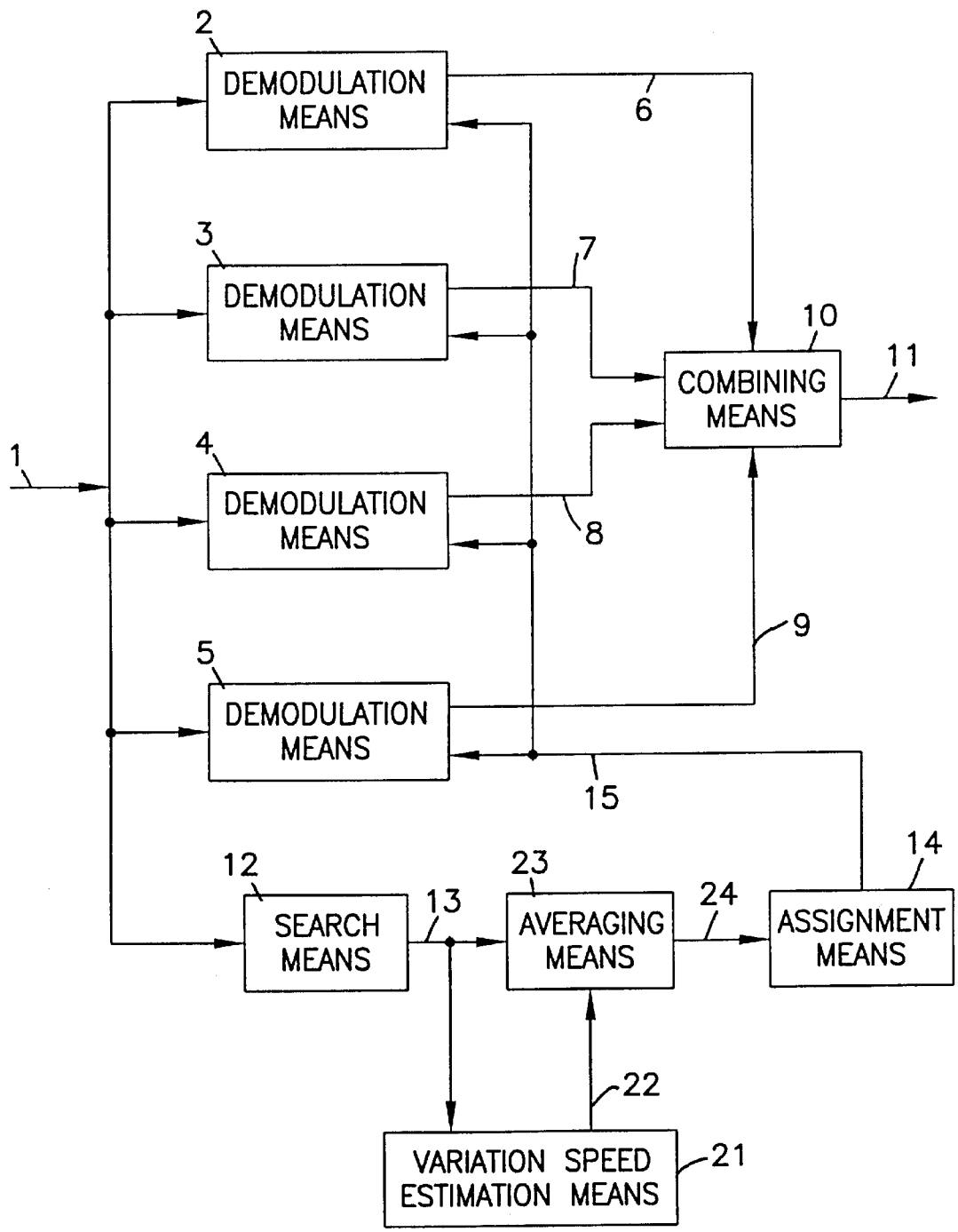
FIG. 6 is a block and schematic diagram of a spread spectrum demodulation receiver constructed in accordance with a first embodiment of the present invention.

A block and schematic diagram of a first embodiment of the present invention is shown in FIG. 6. Circuit elements 1 through 15 of FIG. 6 are the same as those shown in FIG. 3 and described above. Variation speed estimation means 21 operates upon the detected correlation level 13 for each multi-path component to provide an estimated rate of change 22 for each correlation level. Averaging means 23 is coupled to phase assignment means 14 and determines an average correlation level 24 for each multi-path component in accordance with an averaging interval which is based upon the estimated rate of change of the correlation level. In cases in which the estimated rate of change 22 is slow, the averaging interval of the averaging means 23 is set short. In other cases in which the estimated rate of change 22 is fast, the averaging interval is set long. Using the estimated rate of change 22 and the average signal correlation level 24, the phase assignment means 14 assigns different reception timings to be used for demodulation by each of the spread spectrum demodulation means 2, 3, 4, and 5.

The operations of the spread spectrum demodulation system according to the first embodiment of the present invention will now be described. Variation speed estimation means 21 provides an estimated rate of change 22 of the correlation level 13 of a multi-path component which is detected by the correlation level search means 12. Averaging means 23 selects an averaging interval which is based upon the estimated rate of change for the multi-path component and determines an average correlation level of the multi-path component in accordance with the averaging interval. The average correlation level 24 is provided to phase assignment means 14. Based on the average multi-path signal correlation levels which are determined in accordance with the averaging interval, the phase assignment means determines which correlation levels at a given point are the highest detected correlation levels. The phase assignment then assigns reception timings to spread spectrum demodulation means in accordance therewith.

A specific operating example will now be described with reference to FIG. 7a, in which the rate of change of the correlation level of a multi-path component is slow; and a specific operating example will be described with reference to FIG. 7b in which the rate of change is fast. For the sake of simplicity, a case will be considered in which the number of multi-path components is two and only one spread spectrum demodulation means is provided in the receiver. The curves 30 and 31, the cross-over point 33 and the phase assignments 35 and 36 shown in FIG. 7a refer to the same features as those shown and described with reference to FIG. 5a above. Reference numerals 41 and 43 indicate control delays which are due to the search time in the correlation level search means 12 plus the delay occasioned by averaging means 23. Reference numeral 42 denotes a time point when the reception timing of the spread spectrum demodulation means 2 is reassigned the reception timing of the multi-path component A to that of the multi-path component B. Reference numeral 44 (FIG. 7b) indicates and interval in which the reception timing of spread spectrum demodulation means 2 is assigned to demodulate the multi-path component C.

Figure 7A:
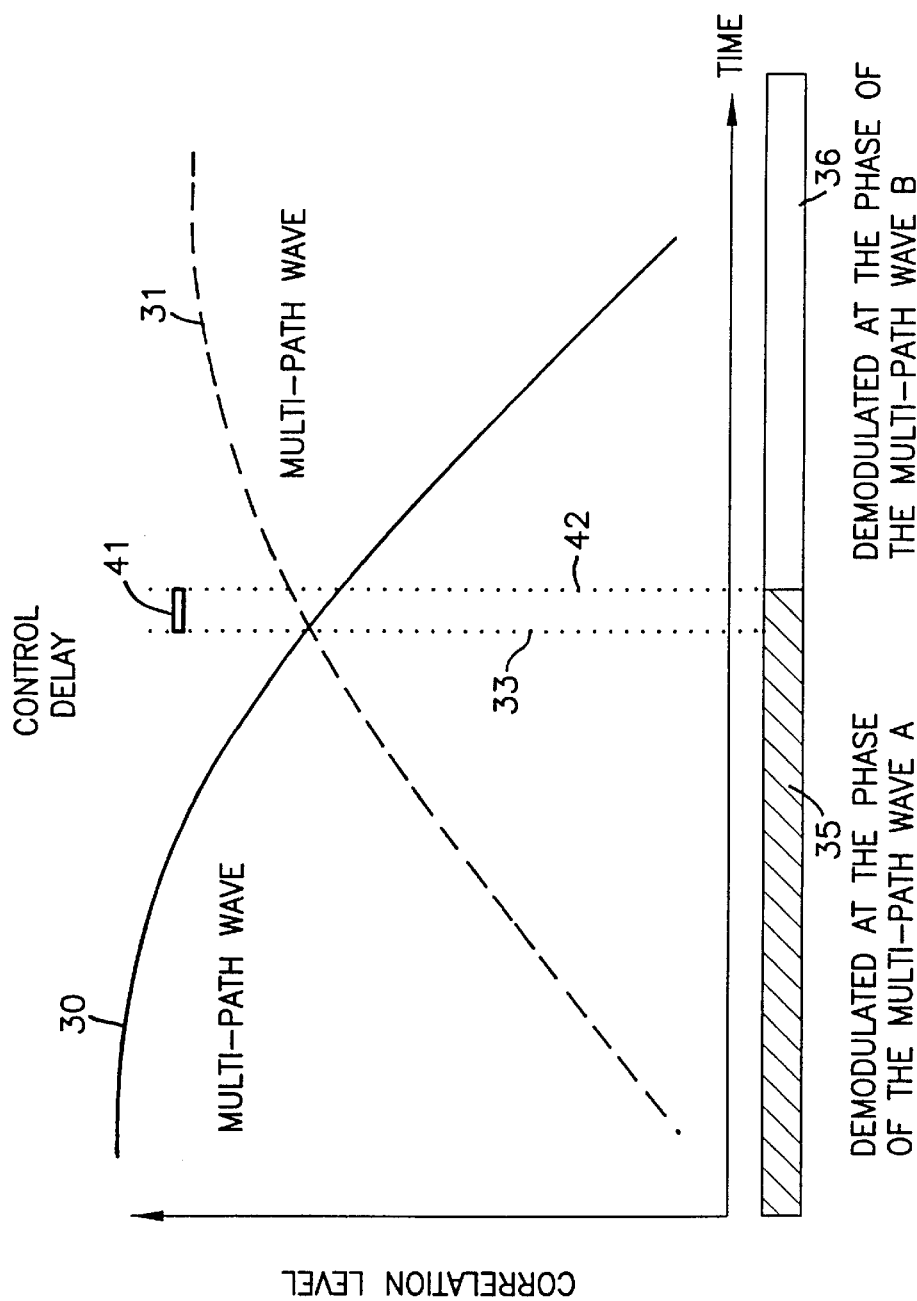
FIG. 7a is a graph according to the first, second and fourth embodiments of the invention, showing the time changes in correlation levels for two multi-path components of a transmission signal and a reception timing assignment provided to a spread spectrum demodulation means, in which the estimated rate of change of the correlation levels is slow.

FIG. 7a shows a case in which the estimated rate of change of a correlation level of a multi-path component is slow. Since the averaging interval in the averaging means 23 is set short, this results in the phase assignment means quickly reassigning the reception timing of a spread spectrum demodulation means 2 from that of the multi-path component A to the reception timing of multi-path component B which has the greater correlation level.

Figure 7B:
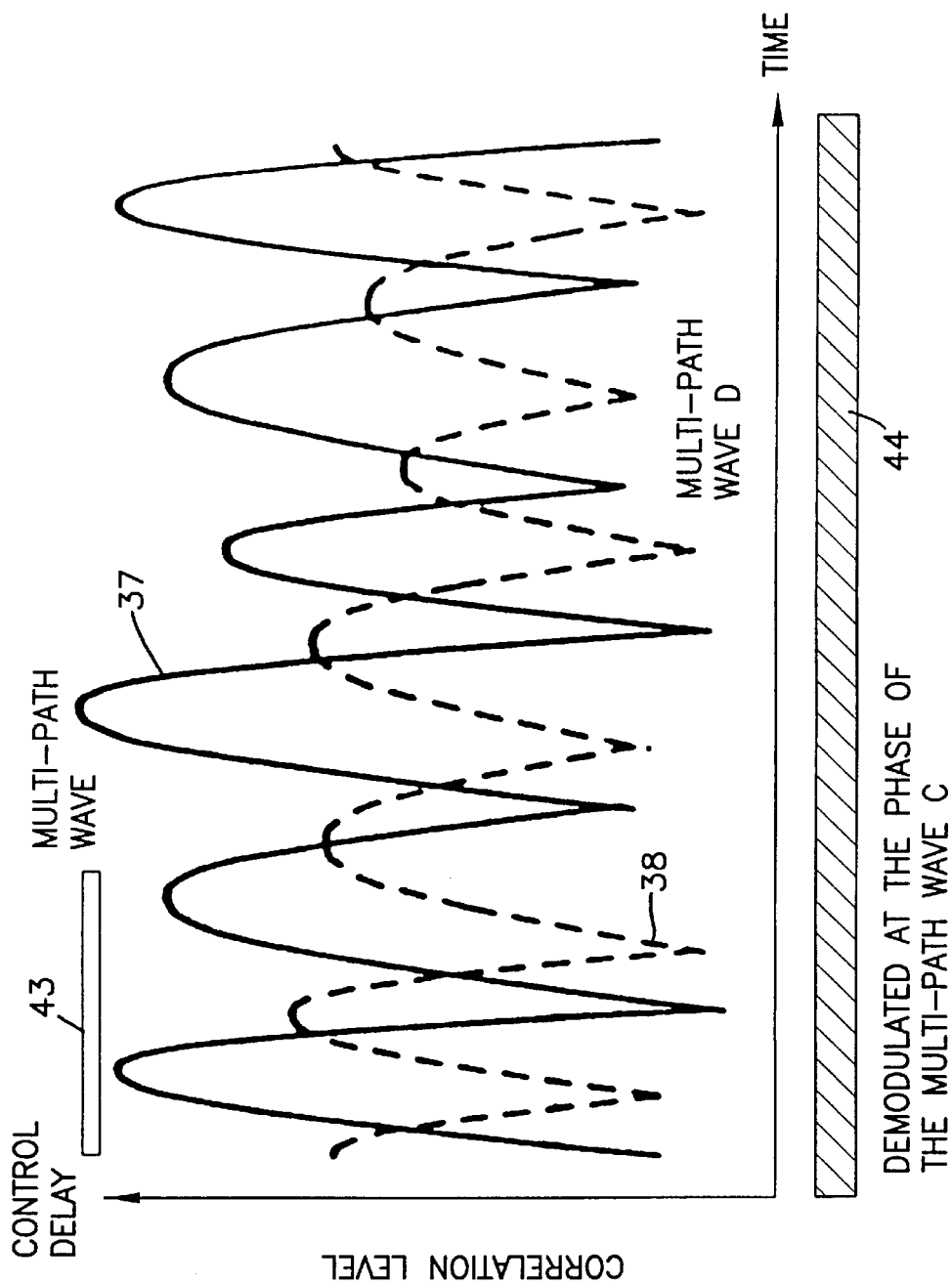
FIG. 7b is a graph according to the first, second and fourth embodiments of the invention, showing the time changes in correlation levels for two multi-path components of a transmission signal and a reception timing assignment provided to a spread spectrum demodulation means, in which the estimated rate of change of the correlation levels is fast.

FIG. 7b shows a case in which the estimated rate of change of the correlation level of a multi-path component is fast. By setting the cycle of averaging means 23 long with respect to the estimated rate of change, this results in the phase assignment means maintaining the reception timing assignment at that of the signal with the highest average correlation level, such that no rapid change over of the reception timing assignment occurs. In such way, demodulation is performed at the reception timing for which the overall correlation level over time is higher.

In the above-described operating example, the case was considered in which the number of multi-path components is two and the assignment of only one spread spectrum demodulation means is considered. The skilled person in the art will understand the operation of the present invention in a case in which a plurality of spread spectrum demodulation means are used to demodulate a plurality of multi-path components. Through the improvements provided by the present invention as described above, the reception timing assignments used for demodulation by a RAKE type receiver can be maintained for demodulating the multi-path components which are more closely associated with the maximum correlation level than as performed by the prior art RAKE type receiver.

Figure 8:
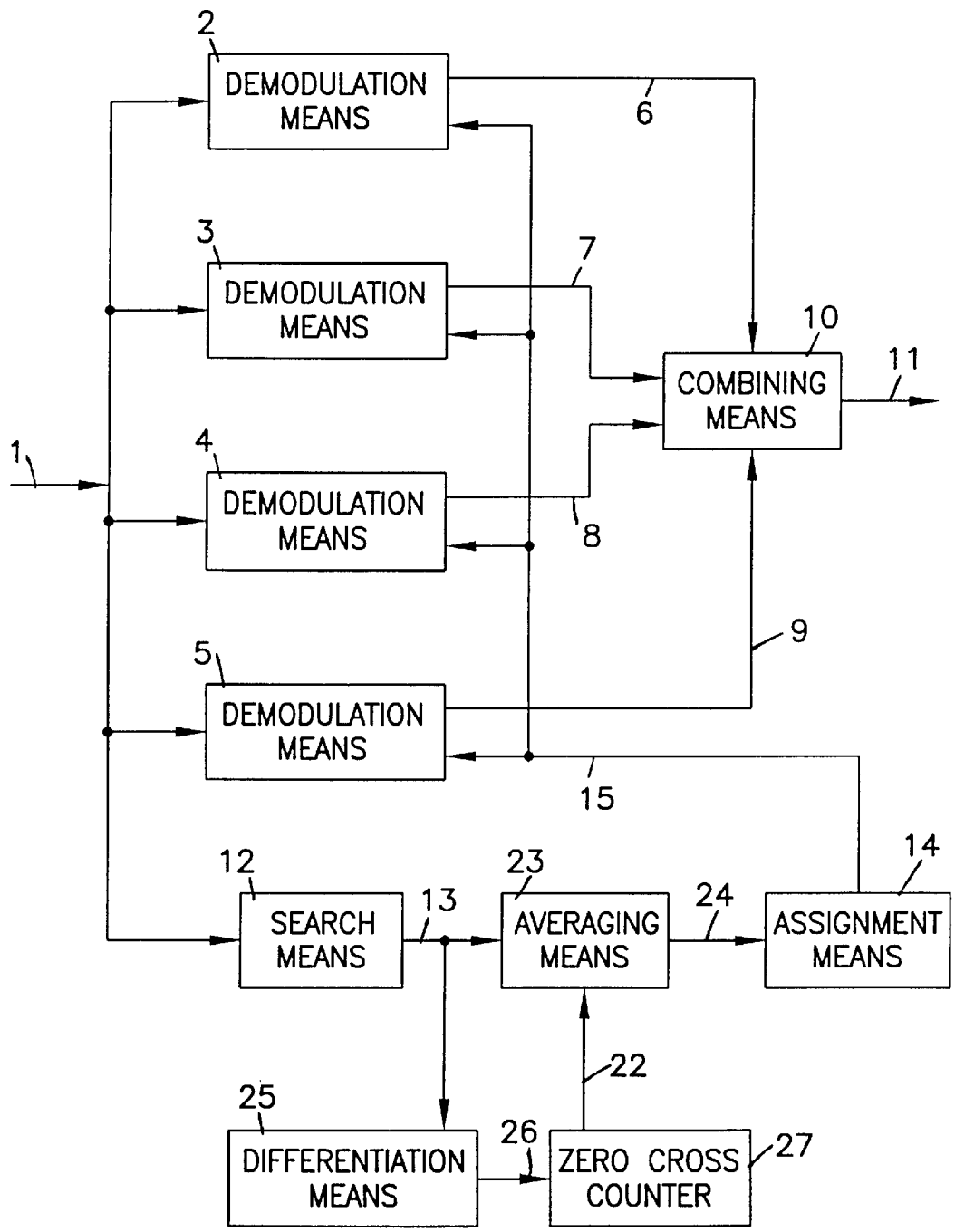
FIG. 8 is a block and schematic diagram of a spread spectrum demodulation receiver constructed in accordance with a second embodiment of the present invention.

FIG. 8 is a block and schematic diagram which shows an improved RAKE type receiver according to a second embodiment of the present invention. In FIG. 8, reference numerals 1 through 15, and 22 through 24 denote elements which are the same as those shown in FIG. 6 and described in the accompanying text. As shown with the specific interconnections illustrated in FIG. 8, the variation speed estimation means is constructed in accordance with this embodiment of the present invention by a differentiation means 25 and a zero-crossing counter 27. Differentiation means 25 is used to differentiate the correlation level 13 of a multi-path component of a detected transmission signal. Reference numeral 26 indicates a differentiation signal thereof, and reference numeral 27 indicates a zero crossing counter used to provide a count of the number of zero crossing points of the differentiation signal per unit time.

Figure 9:
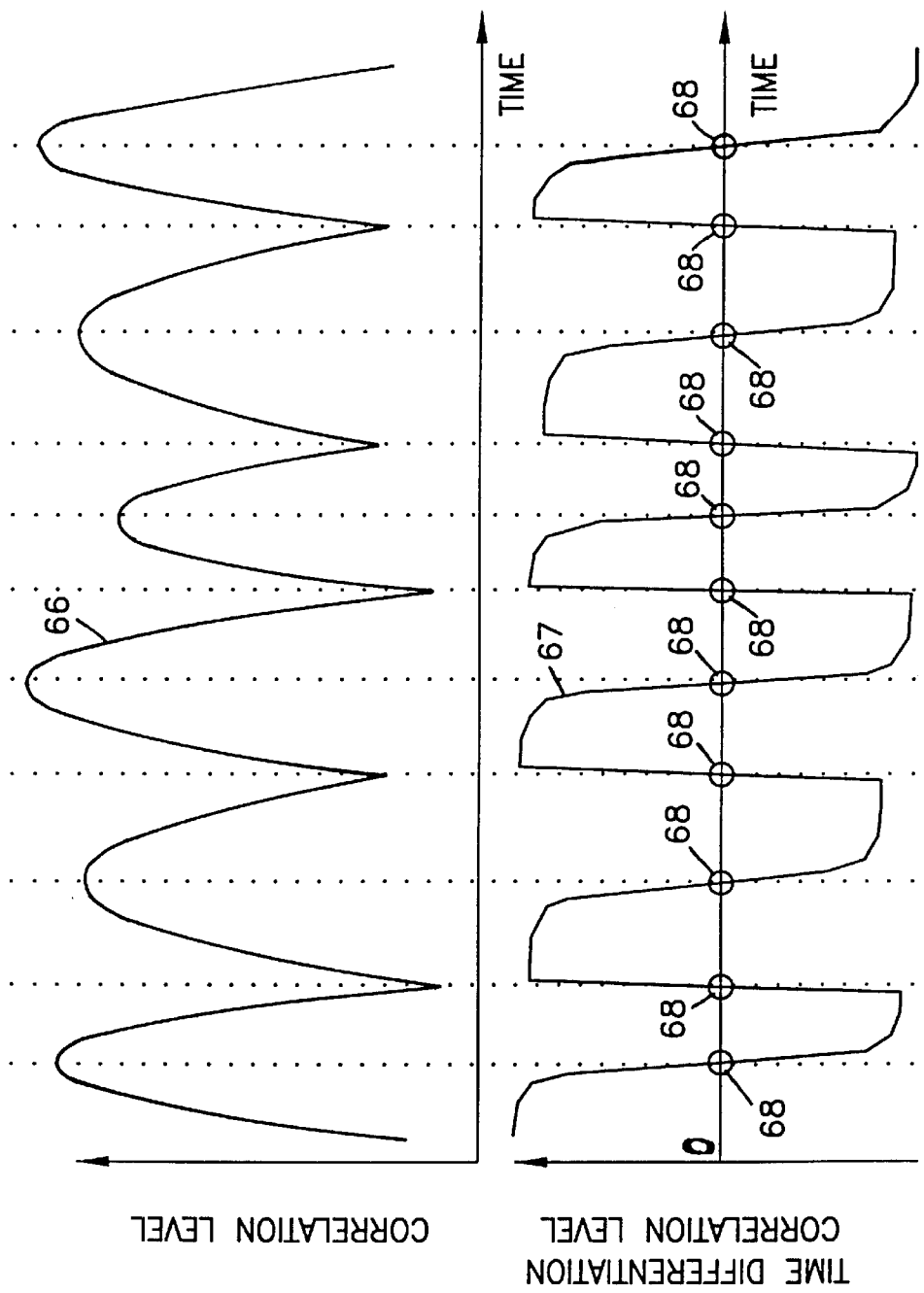
FIG. 9 is a graph showing the time variation of a correlation level for a multi-path component, a differentiation signal thereof, and the zero-crossings of the differentiation signal.

FIG. 9 shows a specific operating example of the operation in accordance with this embodiment of the present invention. In FIG. 9, reference numeral 66 denotes a time change in the correlation level for a given multi-path component, reference numeral 67 indicates a differentiated level of the time change 66, and reference numeral 68 shows the zero crossings of the differentiated level 67. As can be seen from FIG. 9, the fundamental cycle of the correlation level can be estimated by counting the number of zero-crossings unit time in the differentiated signal 66.

In operation, in accordance with the estimated fundamental cycle of the correlation level which is provided by the zero-crossing counter 27 the phase assignment means assigns a reception timing for demodulation by the demodulation means 2 which corresponds to the highest correlation level.

Figure 10:
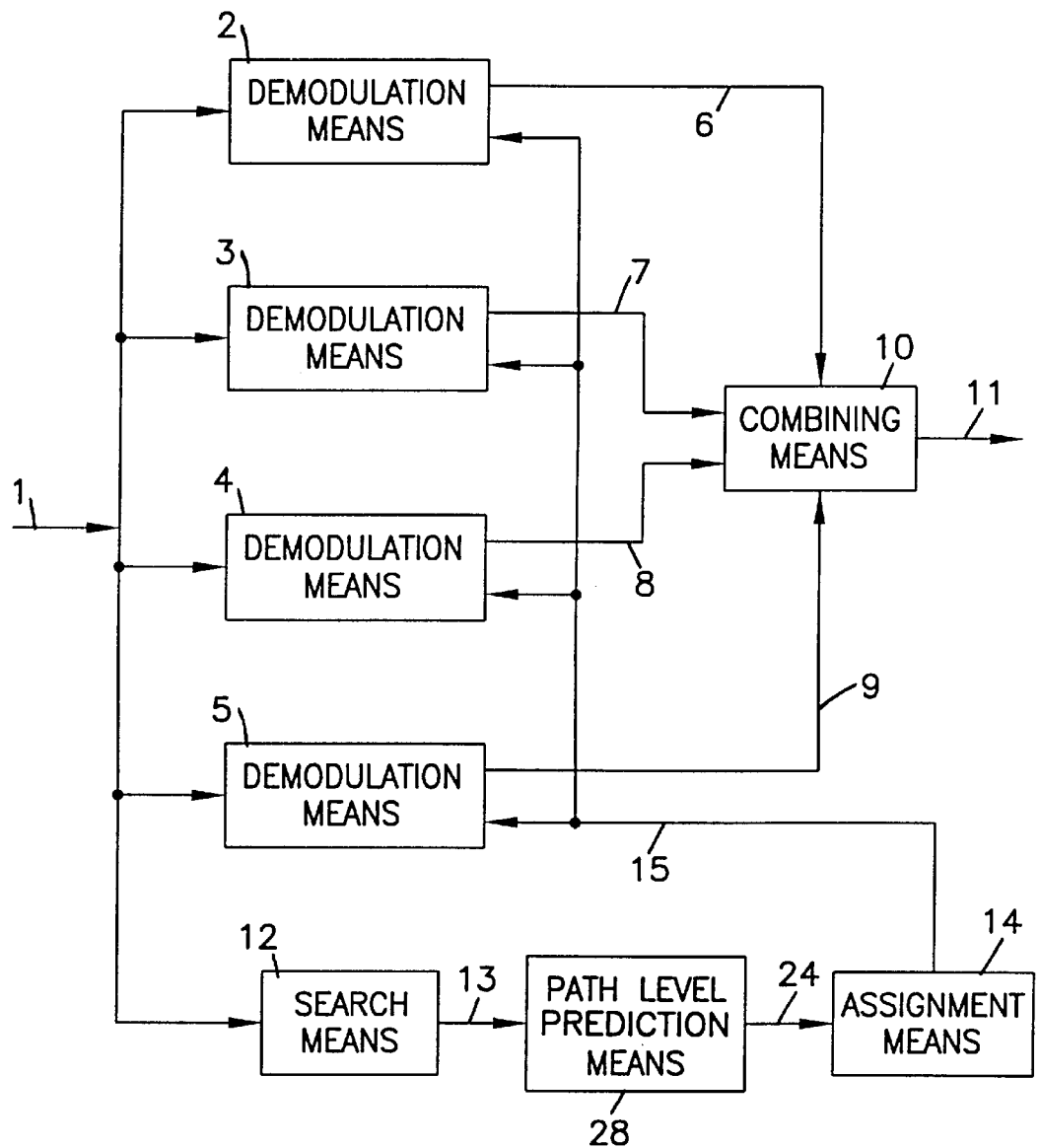
FIG. 10 is a block and schematic diagram of a spread spectrum demodulation receiver constructed in accordance with a third embodiment of the present invention.

FIG. 10 is a block and schematic diagram illustrating the construction of a third embodiment in accordance with the present invention. Reference numerals 1 through 15 and 24 of FIG. 10 show the same elements as those shown in FIG. 6 and described in the accompanying text. In FIG. 10, reference numeral 28 denotes a path level prediction means for use in predicting the correlation level for a multi-path component of a multi-path signal. The path level prediction means 28 receives the correlation level 13 for a multi-path component from the correlation level search means 12 and provides a predicted correlation level 24 to phase assignment means 14 for use in assigning a reception timing to a spread spectrum demodulation means 2. The predicted correlation level may be obtained through a generally used wave form prediction method, for example, in which a predicted value is obtained through weighted averaging of the correlation level values observed in the past.

The operations of the spread spectrum demodulation system according to the third embodiment will now be described. Path level prediction means 28 predicts a correlation level for a multi-path component from the correlation level 13 that is detected for each reception timing by the correlation level search means 12. Phase assignment means 14 then uses the predicted correlation level 24 to assign a reception timing to a spread spectrum demodulation means 2, 3, 4, or 5 in accordance with the predicted correlation level value so as to achieve a more precisely timed changeover of the reception timing assignment.

Figure 11:
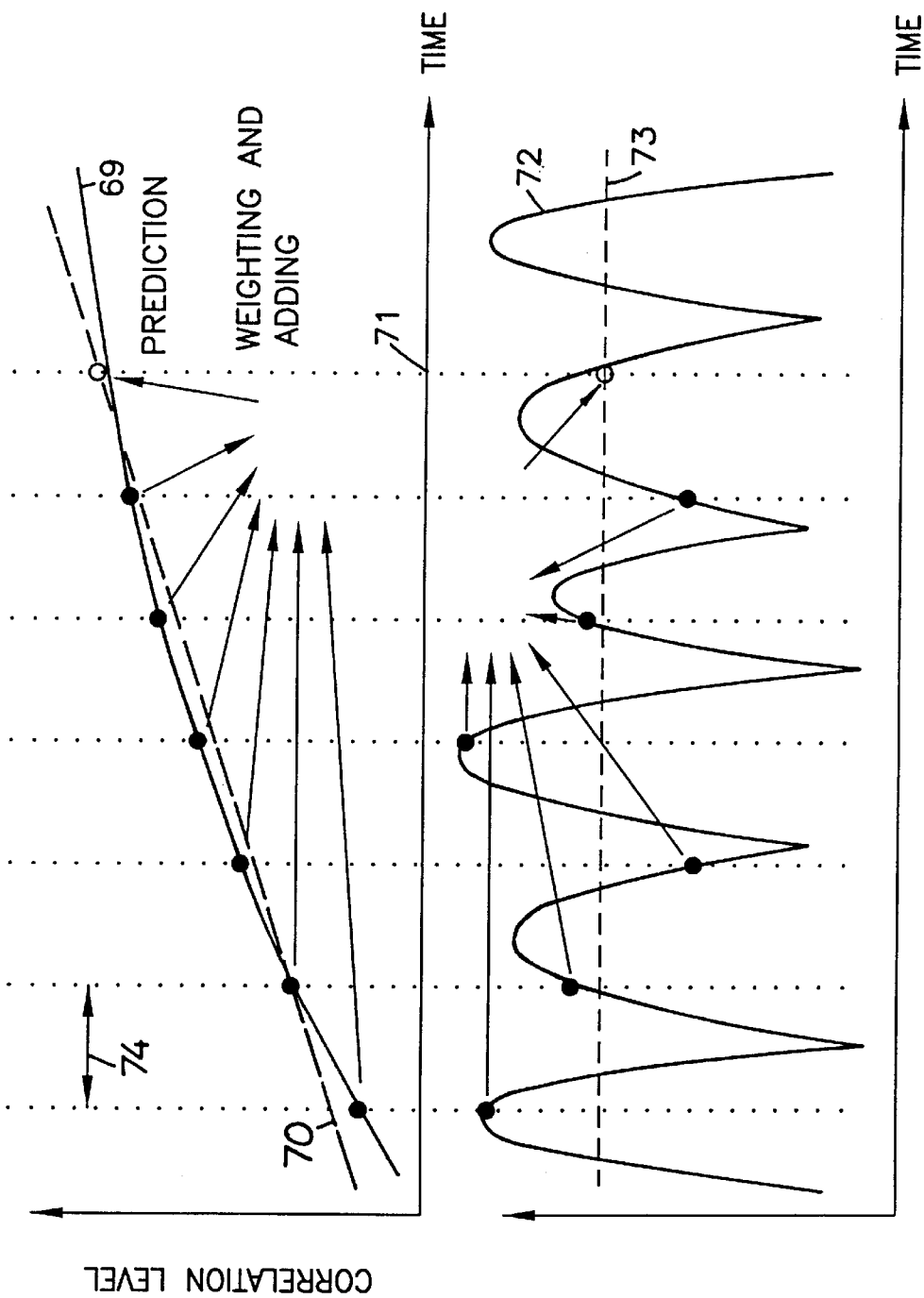
FIG. 11 is a graph illustrating the operations of the correlation level prediction means according to the third embodiment of the invention.

An example of the operation of this embodiment of the present invention will now be described, with reference to FIG. 11. As shown in FIG. 11, reference numerals 69 and 72 indicate time changes in the observed correlation level for a multi-path component in which the rate of change of the correlation level is relatively slow in one case, and in another case in the rate of change is fast. Reference numerals 70 and 73 show trends of predicted correlation levels obtained for each of the respective time changes in the correlation levels 69 and 72. Time points 71 indicates when the predicted correlation levels are determined. A sampling interval is indicated by reference numeral 74.

The correlation level prediction value is determined in accordance with the following formula:

$$\hat{x}(n+1) = \sum_{k=0}^{N-1} a_k \cdot x(n-k)$$

where $a_k$ is a weighting coefficient x(n) is a sample value at time nT, wherein T is a sampling interval, n is an integer and N is an observation period. In this manner, a predicted value is obtained by applying a respective weight to a sample value up to the present time.

In FIG. 11, trends 70 and 73 are linear lines obtained by weighted averaging of past measurements of signal correlation levels, wherein a predicted correlation level is to be determined at time point 71. In cases where the rate of change of a correlation level is slow, it is possible to perform the prediction with relatively high accuracy. However, in cases where the rate of change of a correlation level is fast, the predicted correlation level remains an imprecise measure of the actual correlation level and represents an average correlation level for the signal.

As a specific operating example of a RAKE type receiver in a accordance with this embodiment of the present invention, a case will be described in which the rate of change of a multi-path component is slow; and another case in which the rate of change of a correlation level is fast, with reference to FIGS. 12a and 12b, respectively. For the sake of simplicity, the case will be considered in which the number of multi-path components is two and only one spread spectrum demodulation means provided in the receiver.

Figure 5A:
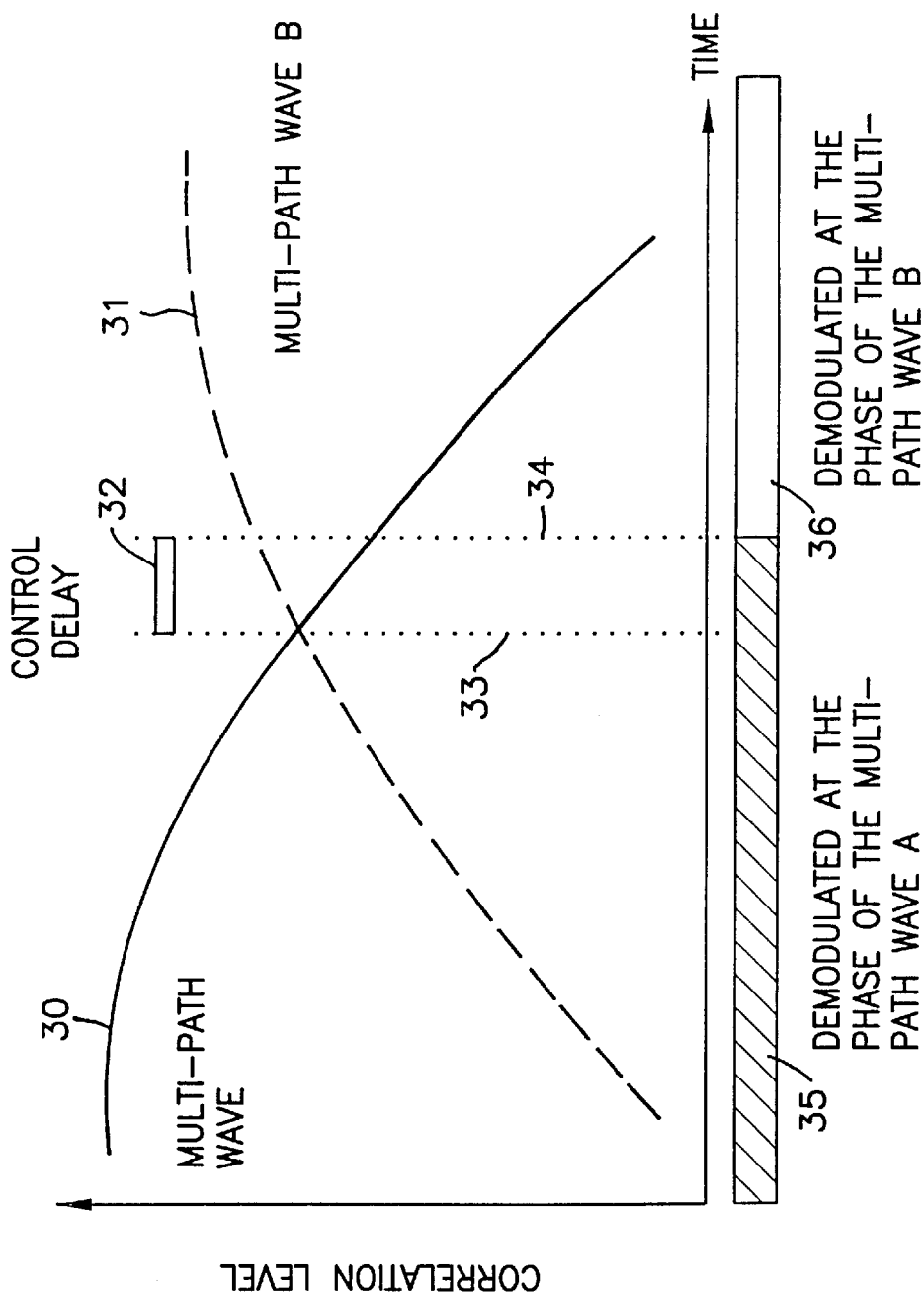
FIG. 5a is a graph according to the prior art reception timing assignment control, showing the time changes in correlation levels for two multi-path components of a transmission signal and a reception timing assignment provided to a spread spectrum demodulation means, in which the estimated rate of change of the correlation levels is slow.
Figure 5B:
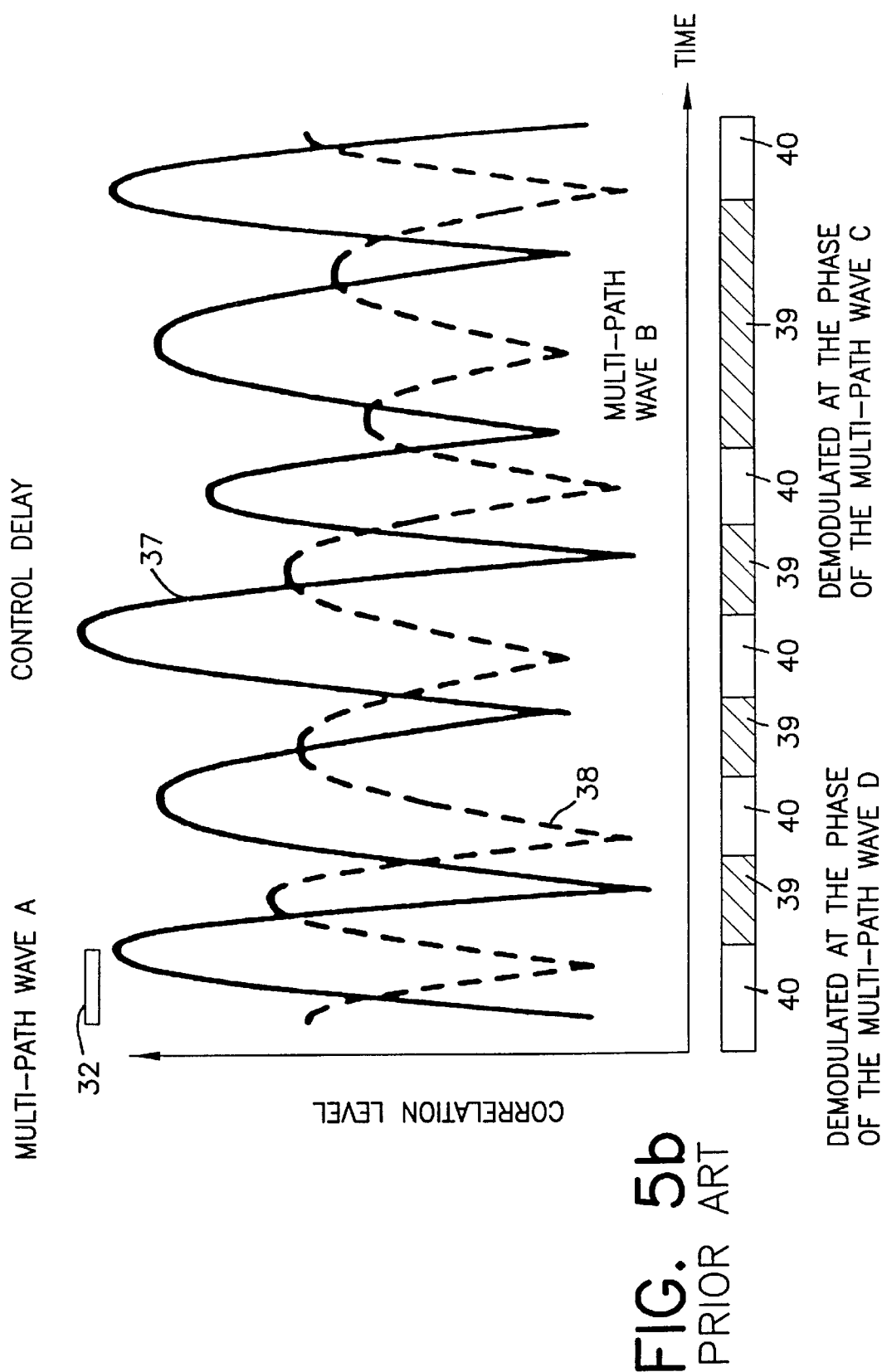
FIG. 5b is a graph according to the prior art reception timing assignment control, showing the time changes in correlation levels for two multi-path components of a transmission signal and a reception timing assignment provided to a spread spectrum demodulation means, in which the estimated rate of change of the correlation levels is fast.
Figure 12A:
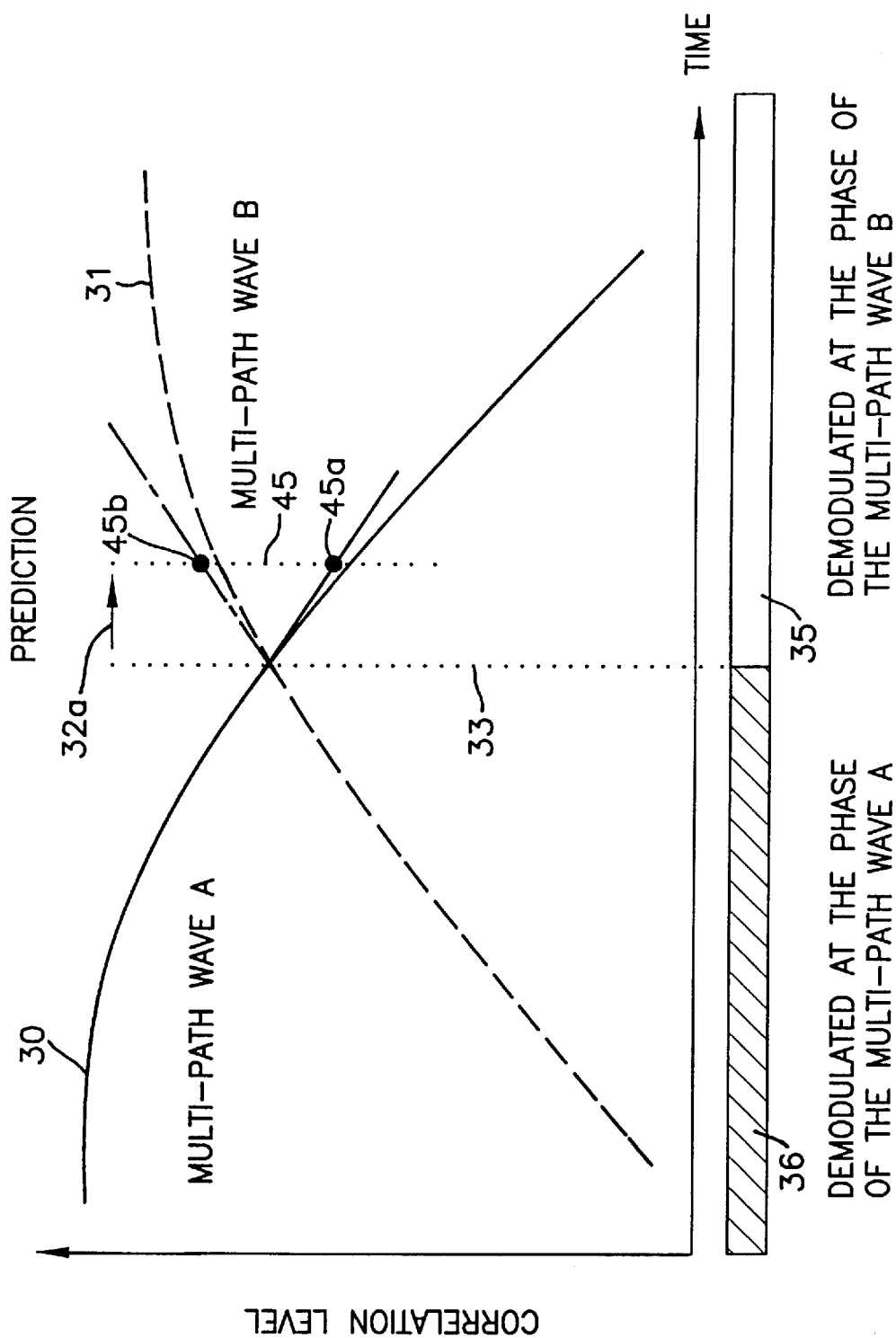
FIG. 12a is a graph according to the third embodiment of the invention, showing the time changes in correlation levels for two multi-path components of a transmission signal, predicted correlation levels, and a reception timing assignment provided to a spread spectrum demodulation means, in which the rate of change of the correlation levels is slow.
Figure 12B:
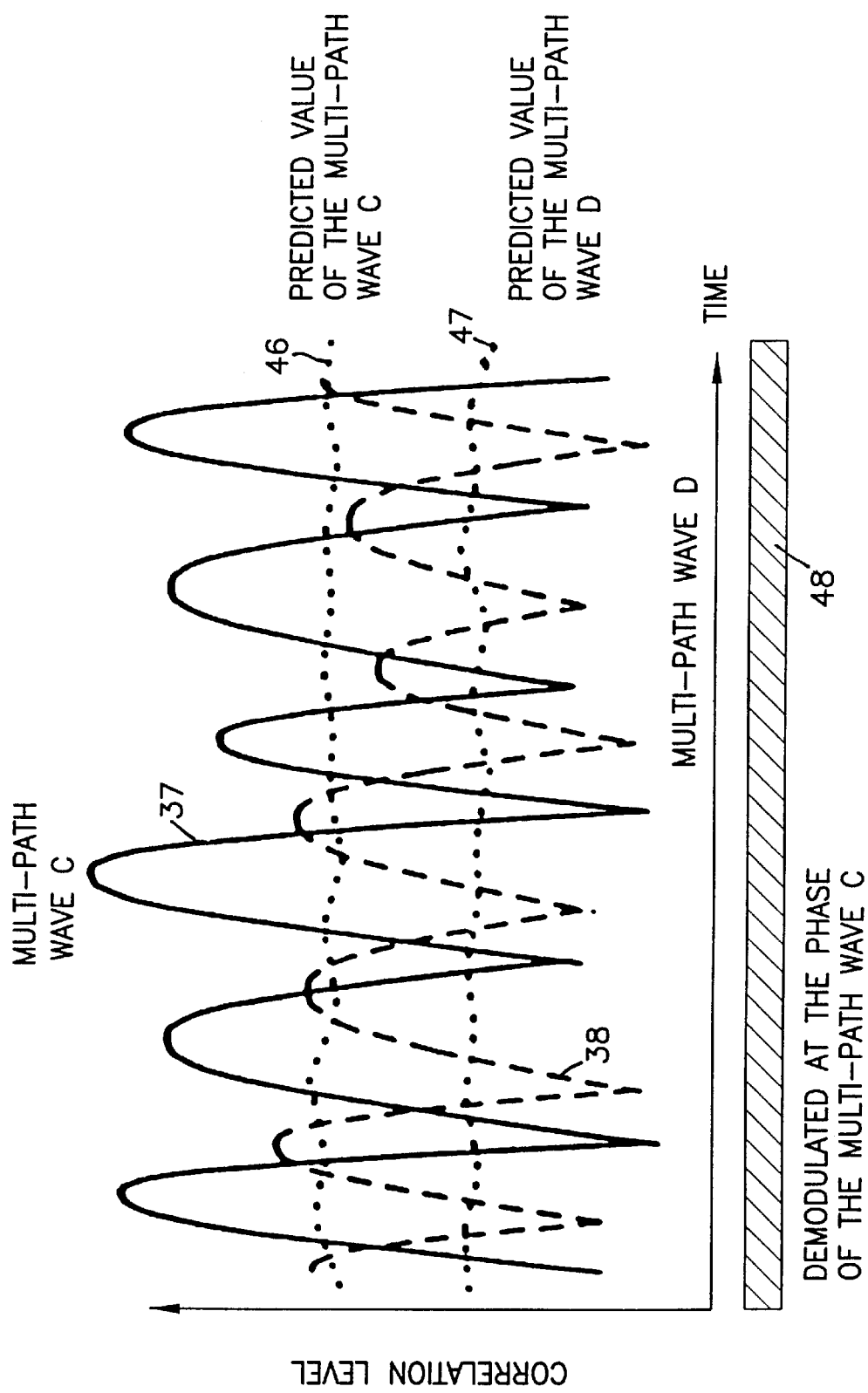
FIG. 12b is a graph according to the third embodiment of the invention, showing the time changes in correlation levels for two multi-path components of a transmission signal, predicted correlation levels, and a reception timing assignment provided to a spread spectrum demodulation means, in which the rate of change of the correlation levels is fast.

In FIGS. 12a and 12b reference numerals 30, 31, 33 and 35 through 38 refer to the same curves and features as those shown in FIGS. 5a and 5b and described in the accompanying text. Reference numeral 45a indicates the predicted value of correlation level of multi-path component A after interval 32a predicted at the time point 33. Reference numeral 45b indicates the predicted value of the correlation level of multi-path component B after interval 32a predicted from the time point 33. The predicted value 46 of the correlation level of multi-path component C is shown in FIG. 12b as is the predicted value 47 of the correlation level of multi-path component D. Interval 48 indicates when the reception timing of the spread spectrum demodulation means is set to that of the multi-path component C.

As shown in FIG. 12a, it can be understood from the predicted correlation levels 45a and 45b of the multi-path components A and B which are made at the time point 33 that the correlation level of the multi-path component B is predicted to exceed that of the multi-path component A after the time point 33. Based on such prediction, the phase assignment means assigns the reception timing of the spread spectrum demodulation means to demodulate the multi-path component B, without incurring a control delay following time point 33 as in the prior art RAKE type receiver.

However, in the case illustrated in FIG. 12b, the predicted correlation levels 46 and 47 are averages of the correlation levels detected for each of the respective multi-path components C and D. In such case, the phase assignment means 14 assigns the reception timing of the demodulation means 2 to that of the higher average correlation level which is determined in accordance with the predicted correlation levels 46 and 47. As a result, the reception timing assignment of demodulation means 2 is maintained at the reception timing for multi-path component C during the interval 48, such that the reception timing assignment of the demodulation means 2 is not switched frequently, with the resultant decreased demodulation performance, as occurs in the prior art RAKE type receiver.

Referring again to FIG. 10, in the present invention, by making an assignment of the reception timings of the spread spectrum demodulation means 2 to 5 in accordance with the predicted correlation levels 24, the RAKE type receiver may be operated at phases which more closely correspond to the maximum correlation level, which thereby improves the quality of reception.

Figure 13:
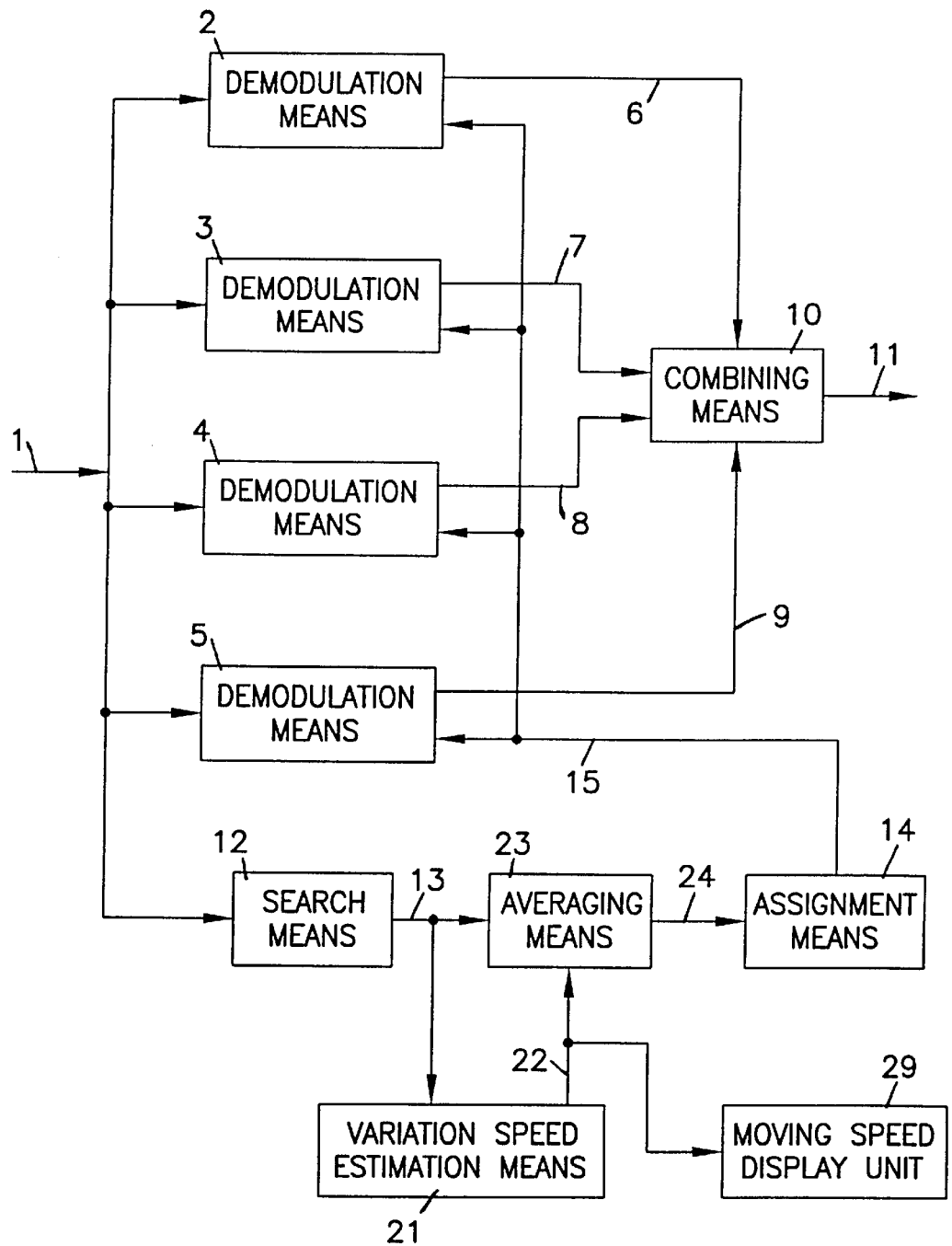
FIG. 13 is a block and schematic diagram of a spread spectrum demodulation receiver constructed in accordance with a fourth embodiment of the present invention.

A block and schematic diagram showing the construction of a fourth embodiment of the present invention is shown in FIG. 13. Reference numerals 1 through 15, and 21 through 24 of FIG. 13 indicate elements which are the same as those shown in FIG. 6 and described in the accompanying text. In FIG. 13 reference numeral 29 indicates a moving speed display unit used to convert a rate of change 22 of the correlation level for a particular multi-path component into a moving speed and display the moving speed. In all other respects, the construction and operations of the fourth embodiment of the present invention are the same as that of the first embodiment of the present invention. Therefore, the construction and operation need not be described again in detail.

In this embodiment of the present invention, the moving speed display unit 29 calculates and displays a relative moving speed between a transmitter and a receiver in accordance with an estimated rate of change 22 in the signal correlation level that was determined by the variation speed estimation means 21. Since the rate of change 22 of a multi-path component and a relative speed of a transmitter and a receiver lie in proportional relation, the relative speed can be easily obtained. This embodiment provides an advantage, in addition to the effects provided by the first embodiment of the present invention, in providing a user with indication of the relative speed between a transmitter of a transmission and a receiver of that transmission.

While the invention has been described in detail herein in accordance with certain preferred embodiments thereof, many modifications and changes therein may be effected by those skilled in the art. Accordingly, it is intended by the appended to cover all such modifications and changes as fall within the true spirit and scope of the invention.

What is claimed is:

1. A spread spectrum demodulation system for demodulating and combining a selected plurality of multi-path components of a digital transmission signal which has been modulated in accordance with a spread code signal, comprising:

a plurality of spread code demodulation means, each demodulation means demodulating a selected one or more of said plurality of multi-path components of said digital transmission signal in accordance with spread code phase and reception timing assignments;

a correlation level search means for determining a correlation level corresponding to a spread code phase and a reception timing for each of said multi-path components;

estimating means for estimating the rates of change of said correlation levels; and a phase assignment means for providing said spread code phase and a reception timing assignment to each of said demodulation means in accordance with said correlation levels and said estimated rates of change.

2. A method for providing a spread code phase and reception timing assignment to each of a plurality of spread spectrum demodulation means for use in demodulating a selected one or more of a plurality of multi-path components of a digital transmission signal which has been modulated in accordance with a spread code signal, comprising the steps of:

determining a correlation level corresponding to a spread code phase and a reception timing for each of said multi-path components;

estimating the rates of change of said correlation levels; and providing a spread code phase and a reception timing assignment to each of said demodulation means in accordance with said correlation levels and said estimated rates of change.

* * * * *